(12) United States Patent
Hwang et al.

(10) Patent No.: US 7,027,218 B2
(45) Date of Patent: Apr. 11, 2006

US007027218B2

(54) THULIUM-DOPED FIBER AMPLIFIER

(75) Inventors: Seong-Taek Hwang, Pyongtaek-shi (KR); Yun-Je Oh, Yongin-shi (KR)

(73) Assignee: Samsung Electronics Co. LTD, Suwon-Si (KR)

( * ) Notice: Subject to any disclaimer, the term of this patent is extended or adjusted under 35 U.S.C. 154(b) by 272 days.

(21) Appl. No.: 10/632,376

(22) Filed: Aug. 1, 2003

(65) Prior Publication Data

US 2004/0114214 A1 Jun. 17, 2004

(30) Foreign Application Priority Data

Dec. 14, 2002 (KR) ...................... 10-2002-0080024

(51) Int. Cl.
*H04B 10/12* (2006.01)

(52) U.S. Cl. ............................... 359/341.5; 359/341.4; 359/341.32; 359/341.33

(58) Field of Classification Search ................ 359/443, 359/107, 333, 341.1, 341.5, 341.4, 341.32
See application file for complete search history.

(56) References Cited

U.S. PATENT DOCUMENTS

| | | | | |
|---|---|---|---|---|
| 5,128,800 | A * | 7/1992 | Zirngibl | 359/341.4 |
| 5,808,786 | A * | 9/1998 | Shibuya | 359/341.33 |
| 6,201,637 | B1 * | 3/2001 | Nilsson et al. | 359/341.33 |
| 6,233,092 | B1 * | 5/2001 | Flood et al. | 359/345 |
| 6,441,953 | B1 * | 8/2002 | Cowle et al. | 359/341.3 |
| 6,646,796 | B1 * | 11/2003 | Song et al. | 359/349 |
| 2002/0001124 | A1 * | 1/2002 | Kinoshita et al. | 359/337.1 |
| 2002/0044336 | A1 * | 4/2002 | Tanaka et al. | 359/334 |
| 2002/0118444 | A1 | 8/2002 | Yenjay | |
| 2004/0114212 | A1 * | 6/2004 | Hwang et al. | 359/334 |

FOREIGN PATENT DOCUMENTS

| | | |
|---|---|---|
| EP | 1039593 A2 | 9/2000 |
| EP | 1263097 A2 | 12/2002 |

OTHER PUBLICATIONS

Zirngibl, M., Gain Control in erbium-doped fibre amplifiers by an all-optical feedback loop, Mar. 28, 1991, Electronics Letters, vol. 27 No. 7, pp. 560-561.*

* cited by examiner

*Primary Examiner*—Mark Hellner
*Assistant Examiner*—Ari M. Diacou
(74) *Attorney, Agent, or Firm*—Cha & Reiter LLC

(57) ABSTRACT

A thulium-doped fiber amplifier is disclosed and includes a thulium-doped fiber to amplify optical signals belonging to S-band, a first pumping unit to output amplified spontaneous emission that represents a peak value in a predetermined wavelength range belonging to C-band, to pump the thulium-doped fiber, and a second pumping unit to output pumping light belonging to the wavelength band different from the C-band to pump the thulium-doped fiber.

12 Claims, 3 Drawing Sheets

THULIUM-DOPED FIBER AMPLIFIER

CLAIM OF PRIORITY

This application claims priority to an application entitled "Thulium-Doped Fiber Amplifier," filed in the Korean Intellectual Property Office on Dec. 14, 2002 and assigned Serial No. 2002-80024, the contents of which are hereby incorporated by reference.

BACKGROUND OF THE INVENTION

1. Field of the Invention

The present invention relates to an optical communication system, and in particular to a wideband amplifier with at least one erbium-doped fiber.

2. Description of the Related Art

Recently, exponential growth in data usage, transfers, etc., has forced wavelength division multiplexing (WDM) optical communication systems to expand their transmission bandwidth. For this reason, wideband communication systems that simultaneously use a C-band between 1530 nm to 1560 nm (conventional band), an L-band between 1570 nm to 1600 nm (long band) and an S-band between 1450 nm to 1500 nm have been studied. Fiber amplifiers that function to amplify optical signals in optical communication systems that included erbium-doped fiber amplifiers (EDFAs) have been widely used. Such EDFAs have a bandwidth limited to about 30 nm with respect to both the C-band and L-band. The S-band has also been used as an EDFA amplifiable band, but the EDFA had difficulty in expanding the S-band. Therefore, other studies have been made regarding a thulium-doped fiber amplifier (TDFA), in which the element, thulium, is used as a new amplifiable medium. However, such TDFAs have a problem, wherein an available pumping light source generally has a wavelength of 1.05/1.56 μm or 1.4/1.56 μm, but a high power laser diode for generating such an wavelength of light is not commercialized yet.

FIG. 1 shows a conventional thulium-doped fiber amplifier (TDFA). The TDFA includes a pump module 110 having a distributed feedback (DFB) laser diode 112 and an erbium-doped fiber amplifier (EDFA) 114, a first and second wavelength selective couplers (WSCs) 120 and 150, a first and second isolators 130 and 170, a pumping light source 140 and a thulium-doped fiber (TDF) 160.

In operation, DFB laser diode 112 outputs first pumping light at a wavelength of 1.56 μm. Because the first pumping light has an output lower than a desired output, the output of the first pumping light must be increased. Therefore, EDFA 114 amplifies and outputs the first pumping light. EDFA 114 includes an erbium-doped fiber, a laser diode for outputting pumping light at a wavelength of 0.98 μm to pump the erbium-doped fiber, and a wavelength selective coupler for combining the first pumping light with the power of the erbium-doped fiber. First WSC 120 combines input optical signals belonging to the S-band with the first pumping light and outputs the combined resultants. First isolator 130 is interposed between first WSC 120 and TDF 160 and isolates backward light traveling in a direction opposite to the optical signals. Pumping light source 140 outputs second pumping light at a wavelength of 0.98 μm to pump TDF 160. Second WSC 150 combines the inputted optical signals and first pumping light with the second pumping light and outputs the combined resultants. TDF 160 is pumped by the first and second pumping light, and amplifies and outputs the optical signals. Second isolator 170 is disposed in the rear of TDF

160 and isolates backward light traveling in a direction opposite to the optical signals.

As mentioned above, the conventional TDFA makes use of pumping light at a wavelength of 0.98/1.56 μm, and uses a commercialized laser diode as the pumping light source. In this case, a commercialized high power laser diode may be used as the pumping light source generating pumping light at a wavelength of 0.98 μm, but a high power laser diode generating pumping light at a wavelength of 1.56 μm is not commercially available at this time. For this reason, pumping light outputted from a typical low power DFB laser diode is amplified by the EDFA, and such amplified pumping light is often used. For this reason, both a DFB laser diode for 1.56 μm and an EDFA are needed separately. This leads to a high price load, a large volume, and difficult system integration.

SUMMARY OF THE INVENTION

Accordingly, the present invention has been made to reduce or overcome the above-mentioned limitations occurring in the prior art. One aspect of the present invention is to provide a thulium-doped fiber amplifier employing a pumping structure using only a commercialized high power pumping light source to amplify optical signals belonging to the S-band, thereby allowing for reduction of volume as well as enhancement of price-based competition, as compared with the prior art.

In accordance with the principles of the present invention, a thulium-doped fiber amplifier is provided comprising a thulium-doped fiber for amplifying optical signals belonging to S-band; a first pumping unit for outputting amplified spontaneous emission which represents a peak value in a preset wavelength range belonging to C-band to pump the thulium-doped fiber; and a second pumping unit for outputting pumping light belonging to the wavelength band different from the C-band to pump the thulium-doped fiber.

BRIEF DESCRIPTION OF THE DRAWINGS

The present invention will be more apparent from the following detailed description taken in conjunction with the accompanying drawings, in which.

DETAILED DESCRIPTION OF THE PREFERRED EMBODIMENT

Hereinafter, preferred embodiments of the present invention will be described in detail with reference to the accompanying drawings. For the purposes of clarity and simplicity a detailed description of known functions and configurations incorporated herein will be omitted as it may make the subject matter of the present invention rather unclear.

Figure 1:
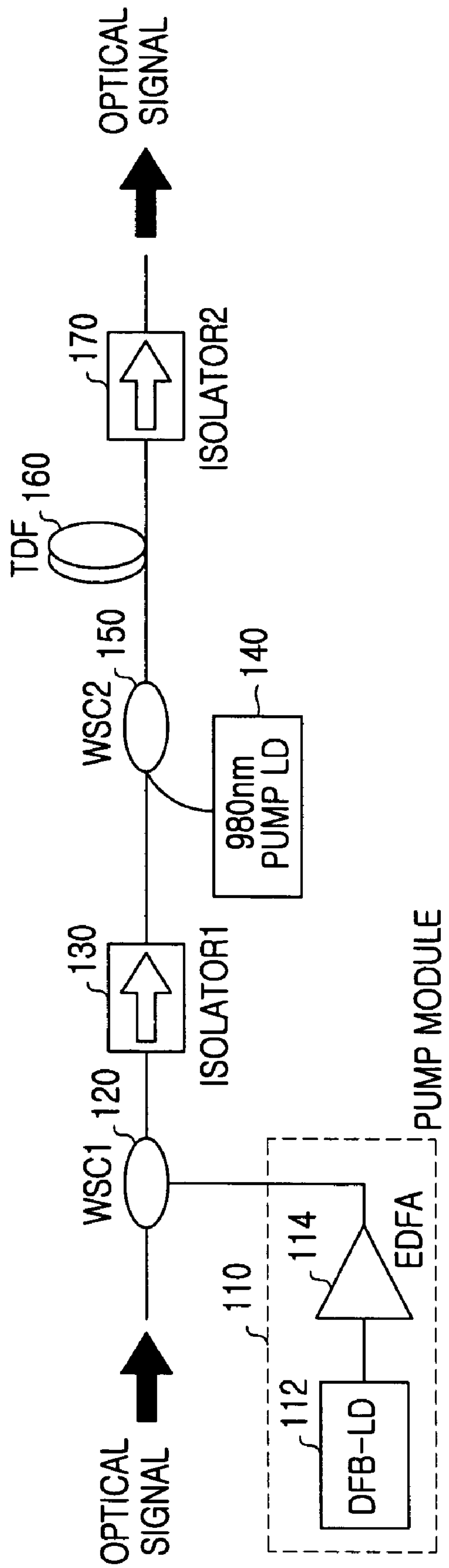
FIG. 1 shows a conventional thulium-doped fiber amplifier.
Figure 2:
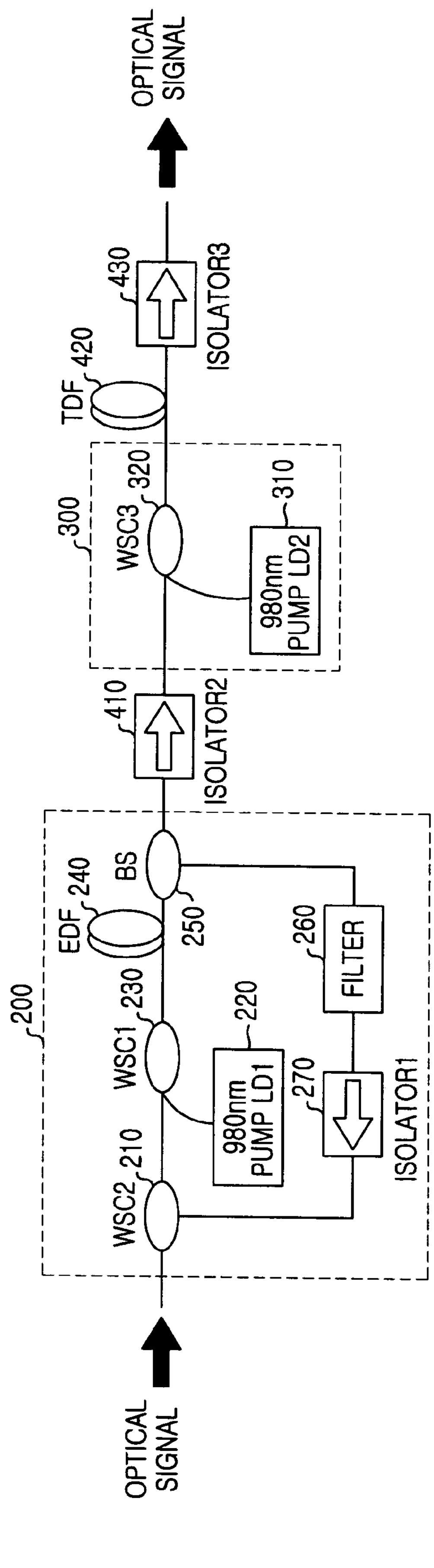
FIG. 2 shows a thulium-doped fiber amplifier according to one illustrative embodiment of the present invention.

FIG. 2 shows a thulium-doped fiber amplifier (TDFA) according to one illustrative embodiment of the present invention. The TDFA includes a first pumping unit 200, a second and third isolators 410 and 430, a second pumping unit 300 and a TDF 420.

First pumping unit 200 outputs amplified spontaneous emission (ASE), which represents a peak value in a preset wavelength range belonging to the C-band, to pump TDF 420. First pumping unit 200 includes first and second WSCs 230 and 210, a first pumping light source 220, an erbium-doped fiber (EDF) 240, a splitter 250, a filter 260 and a first isolator 270.

Second WSC 210 is disposed in the front of EDF 240, combines optical signals belonging to the inputted S-band with the filtered ASE belonging to the C-band and outputs the combined resultants.

First pumping light source 220 outputs pumping light at a wavelength of 0.98 μm to pump EDF 240. A pump laser diode outputting light at a wavelength of 0.98 μm may be used as first pumping light source 220.

First WSC 230 combines the pumping light which is inputted from first pumping light source 220 with the optical signals and the filtered ASE which are inputted through second WSC 210, and outputs the combined resultants.

EDF 240 is pumped by the pumping light inputted through first WSC 230, so that the EDF 240 generates ASE. Further, EDF 240 amplifies and outputs the filtered ASE inputted through first WSC 230 using stimulated emission of erbium ions. EDF 240 is optimized to obtain high power at a wavelength of 1.56 μm, so that the S-band optical signals inputted through first WSC 230 pass through the EDF without a loss.

Splitter 250 is disposed in the rear of EDF 240, and forms a loop as a circulating path of the ASE together with the second WSC 210. The splitter splits power of the inputted ASE, outputs a part of the split power of the ASE (e.g., 10%) to the loop, and outputs the other (e.g., 90%) to the second isolator. The ASE inputted into the loop circulates along to the loop. A beam splitter which splits power of inputted light at a ratio of 1:9 may be used as splitter 250.

Filter 260 is disposed on the loop and filters and outputs the circulating ASE based on a preset transmission wavelength range belonging to the C-band. That is to say, filter 260 transmits only a component of light having a preset wavelength of 1.56 μm from among the inputted ASE, and it blocks the others.

First isolator 270 is also disposed on the loop, transmits the ASE which passes through filter 260, and blocks backward light traveling in a direction opposite to the transmitted ASE. That is, first isolator 270 blocks light inputted from second WSC 210.

The filtered ASE is inputted into second WSC 210. Second WSC 210 combines the filtered ASE and the optical signals and outputs the combined resultants. In the course of this circulation, first pumping unit 200 outputs high-power ASE having a wavelength of 1.56 μm.

Second isolator 410 is disposed between splitter 250 and a second pumping unit 300, so that the second isolator transmits the optical signals and ASE which are inputted from splitter 250 but blocks backward light traveling in a direction opposite to the transmitted ASE.

Second pumping unit 300 outputs pumping light belonging to the wavelength band different from the C-band to pump TDF 420. Second pumping unit 300 includes a second pumping light source 310 and a third WSC 320.

Second pumping light source 310 outputs pumping light at a wavelength of 0.98 μm to pump TDF 420. A pump laser diode outputting light at a wavelength of 0.98 μm may be used as second pumping light source 310.

Third WSC 320 combines the pumping light which is inputted from second pumping light source 310, and the optical signals and the filtered ASE which are inputted through second isolator 410, and outputs the combined resultant.

TDF 420 is pumped by the pumping light and ASE which are inputted through the third WSC 320, so that TDF 420 amplifies and outputs optical signals passing through the same.

Third isolator 430 is also disposed in the rear of TDF 420, transmits the optical signals inputted through TDF 420, and blocks backward light traveling in a direction opposite to the transmitted optical signals.

Figure 3:
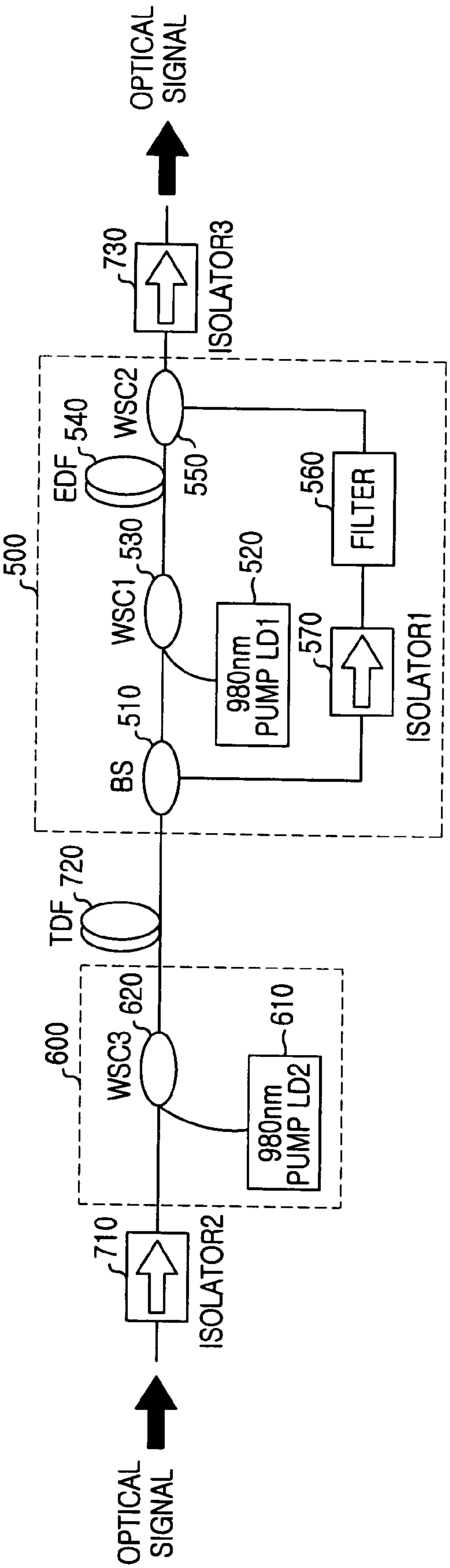
FIG. 3 shows a configuration of a thulium-doped fiber amplifier according to a an other illustrative embodiment of the present invention

FIG. 3 shows a thulium-doped fiber amplifier (TDFA) according to an other illustrative embodiment of the present invention.

The TDFA includes second and third isolators 710 and 730, a second pumping unit 600, a thulium-doped fiber (TDF) 720, and a first pumping unit 500.

Second isolator 710 is disposed in the front of second pumping unit 600, transmits inputted optical signals and blocks backward light traveling in a direction opposite to the transmitted optical signals.

Second pumping unit 600 outputs pumping light to pump TDF 720. Second pumping unit 600 includes a second pumping light source 610 and a third wavelength selective coupler (WSC) 620.

Second pumping light source 610 outputs pumping light at a wavelength of 0.98 μm to pump TDF 720. A pump laser diode outputting light at a wavelength of 0.98 μm may be used as second pumping light source 610.

Third WSC 620 combines the pumping light which is inputted from second pumping light source 610 with the optical signals which are inputted through second isolator 710, and outputs the combined resultant.

TDF 720 is pumped by the pumping light inputted through third WSC 620 and the ASE inputted through first pumping unit 500, so that TDF 720 amplifies and outputs the optical signals passing through the same.

First pumping unit 500 outputs ASE, which represents a peak value in a preset wavelength range belonging to the C-band, so as to pump the TDF 720. First pumping unit 500 includes a splitter 510, a first pumping light source 520, a first WSC 530, an EDF 540, a second WSC 550, a filter 560 and a first isolator 570.

Splitter 510 is disposed in the rear of TDF 720, and forms a loop as a circulating path of the ASE together with second WSC 550. Splitter 510 splits power of the inputted ASE, outputs a part of the split power of the ASE (e.g., 10%) to the loop, and outputs the other (e.g., 90%) to TDF 720. The ASE inputted into the loop circulates along to the loop. A beam splitter which splits power of inputted light at a ratio of 1:9 may be used as splitter 510.

First pumping light source 520 outputs pumping light at a wavelength of 0.98 μm to pump EDF 540. As first pumping light source 520, a pump laser diode outputting light at a wavelength of 0.98 μm may be used.

First WSC 530 combines the pumping light which is inputted from first pumping light source 520 with the optical signals which are inputted through splitter 510, and outputs the combined resultants. Further, first WSC 530 transmits the ASE which is generated at EDF 540 to proceed in a direction opposite to outputted resultants.

EDF 540 is pumped by the pumping light inputted through first WSC 530, so that EDF 540 generates ASE. Further, EDF 540 amplifies and outputs the filtered ASE, which is inputted through second WSC 550, using stimulated emission of erbium ions. EDF 540 is optimized to obtain high power at a wavelength of 1.56 μm, so that the S-band optical signals inputted through the first WSC 530 are amplified within EDF 540 or pass through EDF 540 without being absorbed.

Second WSC 550 is disposed in the rear of EDF 540. Second WSC 550 outputs optical signals belonging to the inputted S-band to the side of third isolator 730 and outputs the filtered ASE belonging to the C-band to the side of EDF 540.

First isolator 570 is disposed on the loop, transmits the ASE, and blocks backward light traveling in a direction opposite to the transmitted ASE. That is, first isolator 570 blocks light inputted from filter 560.

Filtered ASE passing through filter 560 is inputted into the second WSC 550. Second WSC 550 outputs the filtered ASE to EDF 540. In the course of this circulation, first pumping unit 500 outputs high-power ASE having a wavelength of 1.56 μm.

Third isolator 730 is disposed in the rear of the second WSC 550, transmits optical signals inputted through the second WSC 550, and blocks backward light traveling in a reverse direction.

Advantageously, as can be seen from the foregoing, the TDFA according to the present invention employs a pumping structure using only a commercialized high power pumping light source to amplify optical signals belonging to the S-band. Thus, a reduction of volume is achieved and it enhances price-based competition, as compared with the prior art.

What is claimed is:

1. A thulium-doped fiber amplifier comprising:
- a thulium-doped fiber to amplify optical signals belonging to S-band;
- a first pumping unit configured to output an amplified spontaneous emission including an amplified filtered amplified spontaneous emission that represents a peak value within the C-band to pump the thulium-doped fiber; and
- a second pumping unit to output pumping light belonging to the C-band and a different wavelength band to pump the thulium-doped fiber.

2. The thulium-doped fiber amplifier according to claim 1, wherein the first pumping unit comprises:
- an erbium-doped fiber to generate an amplified spontaneous emission;
- a second wavelength selective coupler to combine inputted optical signals and the amplified spontaneous emission;
- a splitter, coupled to form a loop as a circulating path of the amplified spontaneous emission and the second wavelength selective coupler, to split and output power of the amplified spontaneous emission and the optical signals; and
- a filter, disposed on the loop, to filter the circulating amplified spontaneous emission based on a predetermined transmission wavelength belonging to the C-band.

3. The thulium-doped fiber amplifier according to claim 1, wherein the first pumping unit includes a pump laser diode outputting light at a predetermined wavelength.

4. The thulium-doped fiber amplifier according to claim 1, wherein the second pumping unit includes a pump laser diode outputting light at a predetermined wavelength.

5. The thulium-doped fiber amplifier according to claim 4, wherein the predetermined wavelength for the first and second pumping units is 0.98 μm.

6. A thulium-doped fiber amplifier comprising:
- a thulium-doped fiber to amplify optical signals in an S-band;
- a first pumping unit to generate an amplified spontaneous emission including an amplified filtered amplified spontaneous emission to pump the thulium-doped fiber, and disposed to form a loop in a circulating path of the amplified spontaneous emission wherein the amplified spontaneous emission represents a peak value within the C-band, is generated by filtering the circulating amplified spontaneous emission; and
- a second pumping unit to output pumping light to pump the thulium-doped fiber.

7. A thulium-doped fiber amplifier according to claim 3, wherein the first pumping unit comprises:
- an erbium-doped fiber to generate an amplified spontaneous emission;
- a second wavelength selective coupler, disposed on one side of the erbium-doped fiber, to combine the inputted optical signals and amplified spontaneous emission;
- a splitter, disposed on the other side of the erbium-doped fiber, to form a loop of the amplified spontaneous emission and the second wavelength selective coupler, to split and output power of the amplified spontaneous emission and the optical signals; and
- a filter, disposed on the loop, to filter and output the circulating amplified spontaneous emission based on a predetermined transmission wavelength belonging to the C-band.

8. A thulium-doped fiber amplifier according to claim 4, wherein the first pumping unit further comprises:
- a first pumping light source to output pumping light to pump the erbium-doped fiber; and
- a first wavelength selective coupler to combine the pumping light with the power of the erbium-doped fiber.

9. A thulium-doped fiber amplifier according to claim 4, wherein the first pumping unit further comprises a first isolator, disposed on the loop, to transmit the amplified spontaneous emission in one direction.

10. A thulium-doped fiber amplifier according to claim 3, wherein the second pumping unit comprises:
- a second pumping light source to output pumping light belonging to the C-band and a different wavelength band to pump the thulium-doped fiber; and
- a third wavelength selective coupler to combine the pumping light with the power of the thulium-doped fiber.

11. A thulium-doped fiber amplifier according to claim 1, further comprises a second isolator, disposed between the first and second pumping units, to block light inputted from the side of the thulium-doped fiber, wherein the first pumping unit is disposed in the front of the thulium-doped fiber and performs front-pumping of the thulium-doped fiber.

12. A thulium-doped fiber amplifier according to claim 3, wherein the first pumping unit is disposed in the rear of the thulium-doped fiber and performs rear-pumping of the thulium-doped fiber.

* * * * *